United States Patent

Chabrier

[15] 3,683,490
[45] Aug. 15, 1972

[54] AUTOMATIC TOOL LOADER FOR A MACHINE TOOL

[72] Inventor: Martial Chabrier, Le Pecq, France
[73] Assignee: C.H.M.P. Berthiez, Paris, France
[22] Filed: June 1, 1970
[21] Appl. No.: 41,909

[30] Foreign Application Priority Data

June 6, 1969 France....................6918821

[52] U.S. Cl. ...........................29/568, 29/26 A
[51] Int. Cl. ............................B23q 3/155
[58] Field of Search..................29/568, 26 A

[56] References Cited

UNITED STATES PATENTS

| | | | |
|---|---|---|---|
| 3,544,286 | 12/1970 | Oeckl et al. | 29/568 |
| 3,332,142 | 7/1967 | Lehmkuhl et al. | 29/568 |
| 3,300,856 | 1/1967 | Daugherty | 29/568 |
| 3,526,033 | 9/1970 | Saunders | 29/568 |

*Primary Examiner*—Andrew R. Juhasz
*Assistant Examiner*—Z. R. Bilinsky
*Attorney*—Delio & Montgomery

[57] ABSTRACT

An automatic tool loader for a machine tool comprises a magazine containing a plurality of tool holders at respective locations therein, a handling device for removing a required tool holder from the magazine and for supplying the tool holder to a machine tool, the magazine and the handling device being relatively movable to select the required tool holder, the magazine comprising for each tool holder a retaining device which engages and retains the tool holder in the magazine with a limited resiliently biased retaining force which the handling device must overcome to supply the required tool holder to the machine tool, the handling device comprising a connecting device which connects the required tool holder to the handling device with a limited resiliently biased connecting force, said force being sufficient to enable the handling device to supply to tool holder to the machine and to subsequently remove the tool holder from the machine tool when it is released thereby, said force being overcome by the handling device when the tool holder is retained by the machine tool for use or when the tool holder is returned to its location in the magazine, whereby to disconnect the handling device from the tool holder.

6 Claims, 3 Drawing Figures

AUTOMATIC TOOL LOADER FOR A MACHINE TOOL

The present invention relates to an automatic tool loader for use with a machine tool.

The invention is particularly but not exclusively applicable to an automatic tool loader for a vertical lathe.

An automatic tool loader generally permits the removal of a tool which has completed a phase of the work, its return to the compartment of a magazine to which it is allocated, the selection of the compartment in the magazine which contains the tool which is to carry out the next phase, the removal of this tool from the selected compartment, and its delivery to the machine tool in a position such that its positioning and fastening can be effected.

The aim of the present invention is to provide a simple, sure, sturdy, effective, reliable, easily manufactured, relatively inexpensive loader which is of small size and can be fitted without substantial modification to a machine tool.

The present invention also has the object of enabling the operations indicated above to be carried out rapidly, and above all to achieve very accurate and correct positioning and fastening of the tool on the shaping element.

The present invention has another object to allow full freedom of utilization of the machine for the performance of special jobs or short production runs which do not justify programming, by permitting a loader according to the invention to be easily disconnected from the machine tool thereby permitting and facilitating a manual tool-loading operation.

According to the invention, there is provided an automatic tool loader for a machine tool, comprising a magazine, a plurality of tool holders at respective locations therein, a handling device for removing a required tool holder from the magazine and for supplying the tool holder to a machine tool, means supporting the magazine and the handling device for relative movement to select the required tool holder, the magazine comprising for each tool holder a retaining device to engage and retain the tool holder in the magazine with a limited resiliently biased retaining force which the handling device must overcome to supply the required tool holder to the machine tool, the handling device comprising a connecting device to connect the required tool holder to the handling device with a limited resiliently biased connecting force, said force being sufficient to enable the handling device to supply the tool holder to the machine and to subsequently remove the tool holder from the machine tool when it is released thereby, said force being overcome by the handling device when the tool holder is retained by the machine tool for use or when the tool holder is returned to its location in the magazine, whereby the handling device is disconnected from the tool holder.

The retaining device may comprise a detent, the tool holder having means defining a recess therein which is engaged by the detent, a leaf spring supporting the detent from the magazine and resiliently biassing the detent into the recess.

The recess may be a notch having a retaining face perpendicular to the relative motion between the tool holder and the magazine which occurs when the tool holder is supplied to the machine tool, the detent having a face which engages the retaining face when the detent is in the notch, and is inclined to the retaining face at an angle slightly greater than the angle of friction existing between the engaged faces.

The connecting device may comprise a detent, the tool holder having means defining a recess therein which is engaged by the detent, a leaf spring supporting the detent from the handling device and resiliently biassing the detent into the notch.

The last-mentioned recess may be a notch having a retaining face perpendicular to the relative motion between the tool holder and the handling device during disconnection thereof, the detent having a face which engages the retaining face when the detent is in the notch, and is inclined to the retaining face at an angle slightly greater than the angle of friction existing between the engaged faces.

The retaining device and the connecting device may comprise respective leaf springs, at least the leaf spring of the retaining device being straight, a semi-encastre mounting supporting said leaf spring.

Alternatively, or in addition, a semi-encastre mounting may be provided at least for the leaf spring of the connecting device, at least the latter leaf spring being straight except for a bight-shaped curved portion adjacent the mounting.

The handling device may comprise a forked member, each tool holder having shoulders which are engaged by the forked member to support the tool holder.

Each tool holder may comprise inclined surfaces on the shoulders thereof, the fork member having corresponding inclined surfaces which engage the inclined surfaces on the said shoulders to lift the tool holder.

There may be driving and braking means for moving the magazine relative to the handling device into approximate alignment therewith for selecting the required tool holder, indexing means for accurately aligning the magazine and the handling device for selection of the required tool holder, and sensing means for sensing movement of the handling device from a rest position and for releasing the braking means to permit said accurate alignment by the indexing means.

For each said location of the magazine there may be further sensing means for sensing when the magazine and the handling device are in said approximate alignment, and for thereupon operating the braking means until the first-mentioned sensing means releases the braking device.

Various other characteristics of the invention will be clear from the detailed description which follows.

One embodiment of the invention is illustrated by way of non-limitative example in the accompanying drawings, in which.

Figure 1:
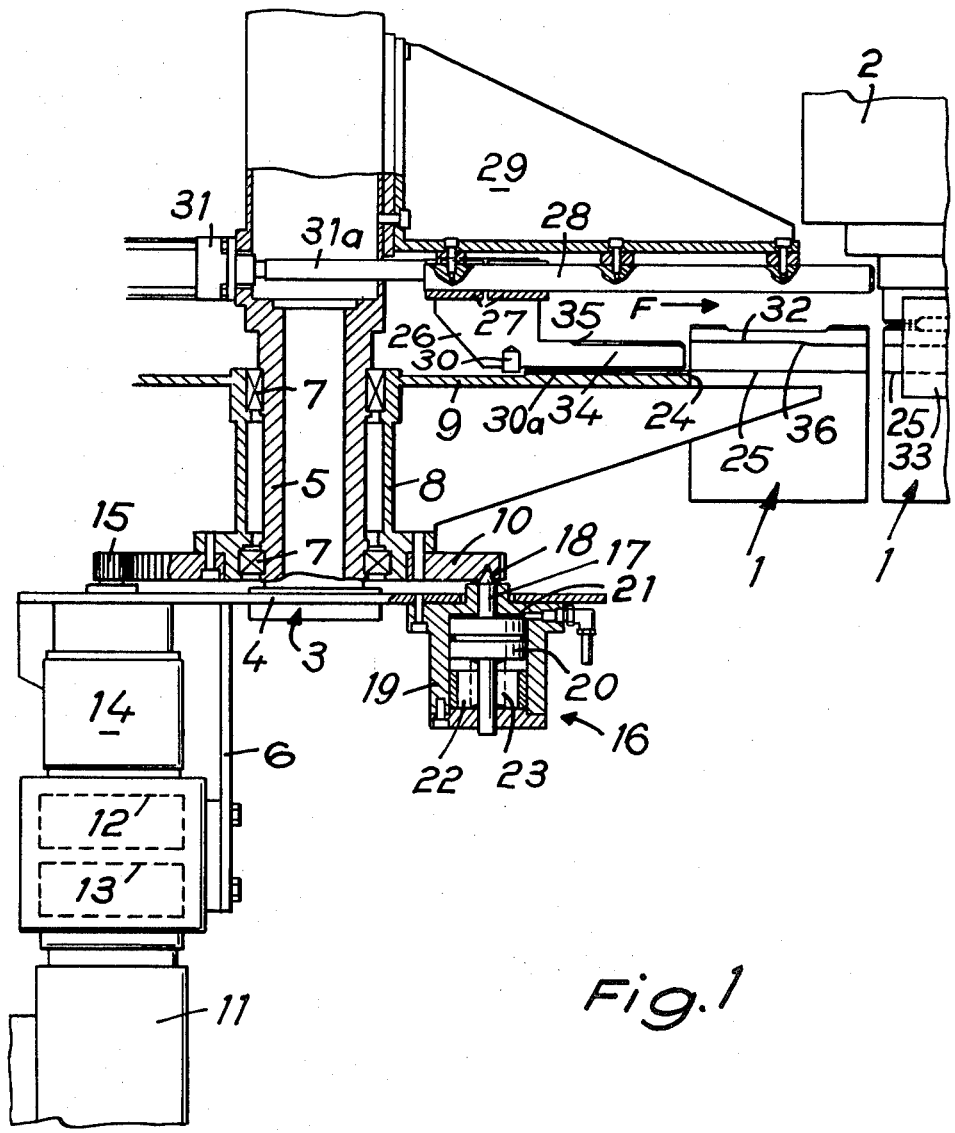
FIG. 1 is a partial diagrammatic elevation and section of an automatic tool loader according to the invention, applied to a vertical lathe.

In FIG. 1, reference 1 indicates a tool holder, and a slide of the movable carriage of a vertical lathe is shown at 2. The tool holder is intended to be positioned accurately in relation to the slide 2 and to be fixed firmly and in a stable manner thereto. In order to achieve this accurate positioning and secure fastening, use may be made of various devices, particularly that illustrated in FIG. 3. This device is not described in the present application because it is described and claimed in my copending U.S. Patent application No. 41,908 filed June 1, 1970 having the title "Tool Support for a Machine Tool."

The tool loader of FIG. 1 comprises a fixed frame 3 containing a plate 4 fastened to a vertical tubular column 5 and at least one fastening bracket 6. A cylindrical drum 8 has integral therewith at the top a plate 9 forming a magazine and at the bottom a toothed crownwheel 10. The drum 8 is mounted for rotation around the column 5, for example by means of bearings and thrust bearings 7. The plate 4 and the bracket 6 support a motor 11 which by means of a brake 12 and a clutch 13 is coupled to a reduction unit 14, the output shaft of which is provided with a drive pinion 15 meshing with the toothed crownwheel 10. This assembly constitutes a driving and braking means for the rotating plate of the magazine 9. In addition, the plate 4 of the fixed frame 3 also carries an indexing device 16 constituted by a vertically guided conical push-rod 17 connected to an operating element and cooperating selectively with a number of conical sockets 18 in the magazine 9 equal to the number or compartments or locations in the latter, these compartments being described hereinbelow and serving to receive and store the tool holders 1. The angular distribution of the sockets 18 is the same as that of the compartments. The operating element of the push-rod 17 is a ram 19, a piston 20 of which bounds a chamber 21, which is connected to a pneumatic circuit for effecting the retraction of the push-rod 17. The piston also bounds a chamber 22 in which there is disposed a spring 23 acting on said piston in order to effect the engagement of the push-rod 17 in the socket 18 situated opposite it.

The rotating plate 9 has on its periphery a number of cutouts 24, matching the shape of the tool holders 1, the cutouts defining the locations or compartments of the magazine. Each cutout is open towards the periphery of the plate 9 and the side edges of the cutout, which are parallel to one another, are intended to support two shoulders 25 situated on each side of the corresponding tool holder 1.

A tool holder handling device comprises a transfer fork 26 situated above the rotating plate 9 and guided for translational movement towards and away from the slide 2; the fork is connected to an operating element so as to be able to connect with a tool holder which has previously been disconnected from the slide 2, in order to return it to its position in the corresponding compartment in the plate 9, which has been previously brought into alignment with the fork. The handling device 26 also is able to pick up the next-required tool holder from its magazine compartment, which previously has been aligned with the fork 26, in order to supply the tool holder to the slide 2.

The fork 26 is fastened to two pairs of C-shaped ball sockets 27 mounted on two cylindrical guide rods 28 fastened under a bracket 29 integral with the column 5. The fork 26 is provided with a finger 30 which, in the rest position of the fork illustrated in FIG. 1, does not contact the rotating plate 9 but which during the translational movement of the fork is guided in a slot 30a, cut radially in the plate 9 and leading into each cutout 24. In addition, the fork 26 is coupled by a bar 31a to the movable part of a ram 31 which forms the aforesaid operating element and the fixed part of which is carried by the column 5.

The tool holders 1 are supported in various ways during the various stages of their handling by the tool loader.

When a tool holder is stored in a compartment 24 it rests by its shoulders 25 on the edges of the cutout in the magazine 9, which forms the compartment in question (FIG. 1).

When a tool holder is situated under the slide 2 and disconnected from the latter, it rests by its shoulders 25 on side sections 33 provided on the slide 2 and constituting guide and support elements (FIG. 1).

When a tool holder is picked up by the fork 26 it rests by its shoulders 32, situated above the shoulders 25, on the two prongs of the fork, but it no longer rests either on the rotating plate 9 nor on the sections 33 of the slide 2.

To lift the tool holder from the sections 33 of the slide 2, the prongs 34 of the fork and the shoulders 32 of each tool holder 1 are provided with inter-engaging inclined planes 35 and 36 respectively (FIG. 1) which on the application of the fork to the tool holder, effects a slight lifting thereof.

Figure 2:
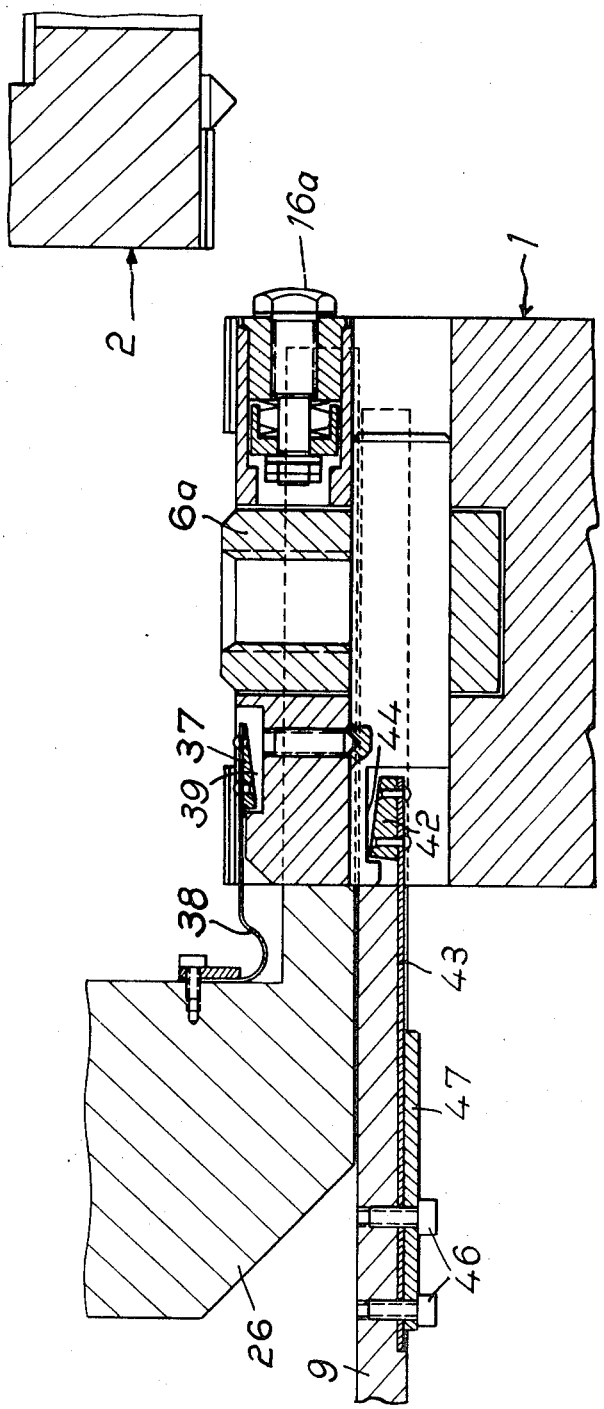
FIG. 2 is a section on a larger scale in the same plane as FIG. 1 and illustrates the operation of the loader.
Figure 3:
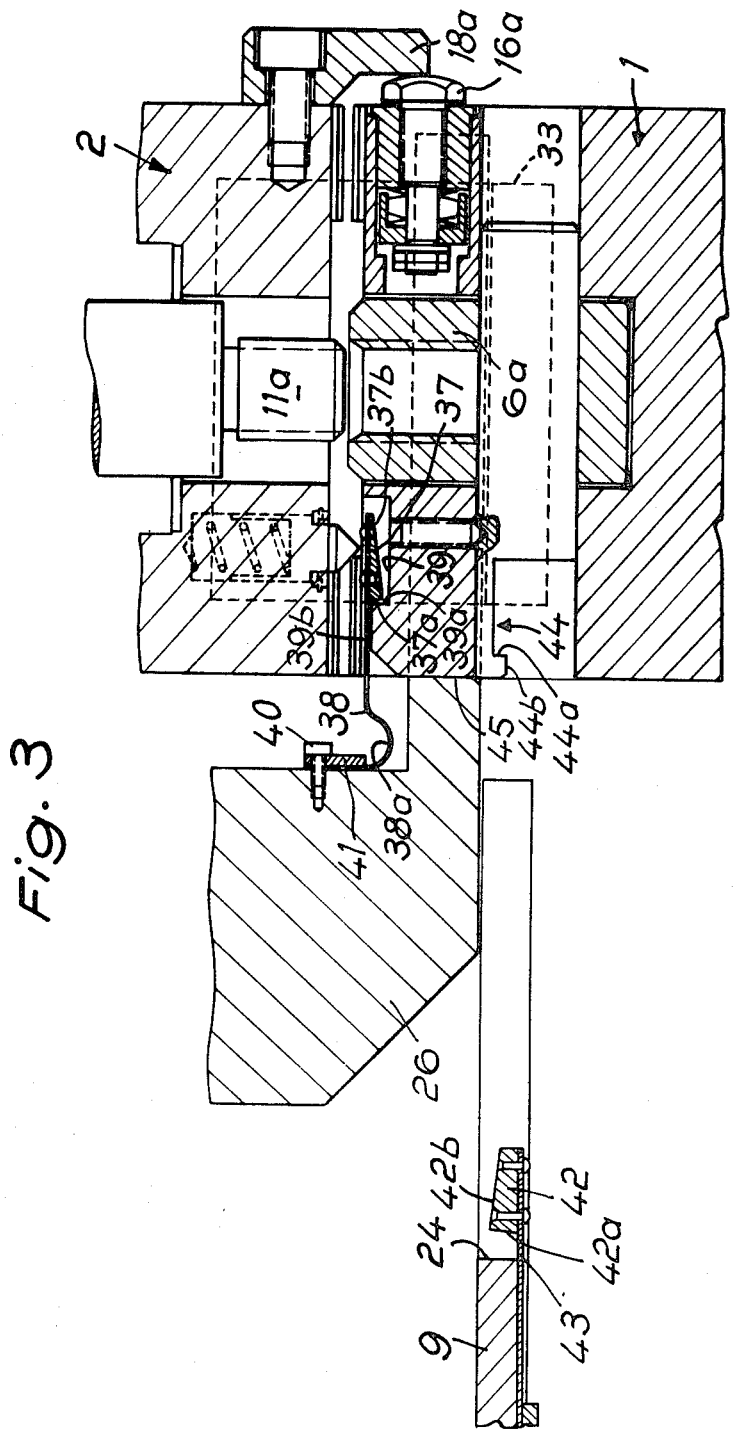
FIG. 3 is a similar view to FIG. 2, showing another phase of the operation of the loader.

Referring to FIGS. 2 and 3, the handling device has a connecting device 37 comprising a detent connected to the fork 26 by at least one calibrated leaf spring blade 38 and adapted to cooperate with a recess or notch 39 provided in each of the tool holders 1. The notch 39 has a retaining face 39a extending substantially perpendicular to the relative motion between the handling device and the tool holder upon disconnection of the one from the other. Thus, the face 39a is substantially vertical. A substantially horizontal cam surface 39b is provided to deflect the detent 37 prior to engagement with the notch 39.

The detent has a sloping projecting face 37b provided to cooperate with a cam surface 39b, and an inclined face 37a which engages the retaining surface 39a. The inclination of the face 37a is slightly greater than the angle of friction between the surfaces 37a, 39a.

By means of the inclination of the face 37a and by suitable calibration of the spring 38, a limited connecting force is obtained between a tool holder and the fork 26, this force being sufficient to permit the supply of the tool holder to the slide 2 by the fork and the subsequent removal of the tool holder to its location in the magazine 9 when it has been released by the machine tool. However, the force is overcome by the handling device when the tool holder is retained by the machine tool or when it is located in the magazine 9, and the tool holder is thereby disconnected from the fork 26.

The leaf spring blade or blades 38 is fixed to the fork 26 by means of a screw 40, which with the aid of a covering plate 41 provides a semi-encastre mounting. The leaf spring blade or blades 38 are straight over their entire length apart from near the fork, where there is a bight-shaped portion 38a which enables the correct spring stiffness to be obtained.

The magazine is provided with a respective retaining element 42 for each compartment 24 thereof. Each retaining element 42 comprises a detent connected to the rotating plate 9 by at least one calibrated spring blade 43 and is adapted to cooperate with a recess or notch 44 provided in each of the tool holders 1. Similarly to the notches 39, each notch 44 has a substantially vertical retaining face 44a, perpendicular to the movement of the tool holder relative to the magazine when it is removed therefrom, and a substantially horizontal cam surface 44b intended to deflect the detent 42. The detent has a sloping face 42b intended to cooperate with the cam surface 44b, and an inclined face 42a adapted to engage the surface 44a. The inclination of the face 42a is slightly greater than the angle of friction between the surfaces 42a, 44a.

By means of the inclined face 42a and by suitable calibration of the spring blade 43, a limited retaining force is provided to retain the tool holder in its location in the magazine 9. This force is sufficient to retain the tool holder in its location when the fork 36 is engaged around it, but is insufficient to retain the tool holder when the fork 26 positively moves it out of its location by applying its driving shoulder 45 (FIG. 3) thereto.

The end of the leaf spring blade or blades 43 is fixed to the magazine 9 by means of screws 46, which with the aid of a covering plate 47 form a semi-encastre mounting. These blades 43 are straight over their entire length, and the position of their mounting is adjustable (e.g., by moving the plate 47) to control the spring stiffness.

The slide 2 determines the limit of the movement of the tool holder selected and transported by the fork. For this purpose, the slide 2 has an element 18a which engages an adjustable stop 16a with which each tool holder is provided, when the selected tool holder is inserted in the guide sections 33 of the slide.

The tool loader operates in the manner described below.

At the commencement of a cycle, as illustrated in FIG. 1, the tool holder 1 which has just completed a machining operation is disconnected from the slide 2 and rests on the section guides 33 of the latter. Simultaneously with the disconnection of this tool holder, a programmer which initiated this operation controls the selection of the compartment of the magazine 9 in which said tool holder is to be stored. For this purpose, it connects the chamber 21 of the indexing device to the fluid circuit and thus retracts the indexing push-rod 17, so that the plate 9 becomes free to turn. At the same time it operates the motor 11 and clamps 13 by freeing the brake 12, in order to rotate the plate 9 with the aid of the pinion 15 and the crownwheel 10.

The plate 4 of the frame 3 carries as many microswitches (which can be selected by fingers on the toothed crown-wheel 10) as there are compartments in the magazine 9, these microswitches being connected to the aforesaid programmer. Furthermore, another microswitch is placed in the path of the movable assembly comprising the fork 26, so as to be operated as soon as the latter leaves the rest position illustrated in FIG. 1, this microswitch being in turn connected to the programmer.

The programmer having selected the microswitch on the plate 4 which corresponds to the compartment in which the disconnected tool holder 1 has to be stored, this microswitch is then operated by the finger of the crownwheel 10 which is associated with said compartment, and it simultaneously stops and declutches the motor 11 and clutch 13, and also operates the brake 12, which has the effect of stopping the magazine 9 with the selected location roughly aligned with the fork 26, so that the spring 23 effects approximate engagement of the conical push-rod 17 in the socket 18 in the crownwheel 10 which is associated with the selected location.

The programmer then operates the ram 31 to move the fork 26 towards the slide 2. At the commencement of the movement, the abovementioned microswitch in the path of the fork 26 is operated and through the medium of the programmer releases the brake 12. Then the magazine 9 is free to turn and the spring-loaded conical push-rod 17 completes the alignment thereof by rotating the plate 9 and exactly engaging the socket 18. Thus, the magazine is locked in a very accurate position in which the selected compartment is aligned accurately opposite the tool to be received in it.

The fork 26 then is moved in the direction of the arrow F (FIG. 1) until it reaches the position shown in FIG. 3. It will be seen that the prongs 34 of the fork are engaged over the tool holder 1 which is to be returned to the compartment and which up to that moment had been resting on the section guides 33. During a first phase of this engagement movement the inclined planes 35 and 36 of the prongs 34 of the fork and of the shoulders 32 of the tool holder effect a slight raising of the latter, which now rests only on the aforesaid prongs of the fork. During a second phase of this engagement, the sloping face 37b cooperates with the cam surface 39b to effect the deflection of the spring blade 38 and also the retraction of the detent 37; this is possible because the tool holder 1 to be returned to the compartment is locked through the contact of its stop 16a against the element 18a on the slide. The detent 37, returned by the blade 38, is urged resiliently into the notch 39 and then the drive shoulder 45 of the fork strikes against the tool holder. During the return movement, that is to say the movement in the opposite direction to that of the arrow F, the fork 26, on which the tool holder 1 to be returned to the compartment is locked by the detent 37, brings the tool holder into the selected compartment 24 in the magazine 9 (FIG. 3).

When the tool holder is received in the magazine 9, the sloping face 42b, cooperating with the cam surface 44b, deflects the spring blade 43 and retracts the detent 42 until the latter engages in the notch 44 on the tool holder 1. Simultaneously, the tool holder abuts the end of the cutout 24. The fork 26 continues its return movement but, since the returned tool holder 1 is fully home in the compartment, the detent 37 is deflected because the locking force obtained by contact between the face 37a and the shoulder 39a is insufficient to prevent this displacement of the detent 37.

When the fork 26 reaches the end of its movement, as illustrated in FIG. 1, the programmer again operates in the manner described hereinabove, so as to bring opposite the slide 2 the compartment 24 containing the next tool to be supplied to the slide 2 in place of the one which has just been returned.

The fork 26 is again displaced in the direction of the arrow F and, as illustrated in FIG. 2, engages over the tool holder 1 to be supplied, raising it slightly through the cooperation of the inclined planes 35 and 36. This engagement and also the engagement of the detent 37 in the notch 39, as already described, are possible because the tool holder to be mounted is held in the compartment 24 in the magazine 9 by the detent 42. The locking force produced through the contact of the face 42a with the shoulder 44a is sufficient to prevent the tool holder in question from being moved by the fork 26 as a result of friction and the deflection of the detent 37. As soon as the driving shoulder 45 of the fork comes into contact with the tool holder, the driving however becomes positive and the aforesaid locking force is no longer sufficient to prevent it. Consequently, the detent 42 is deflected and frees the tool holder which is then transported by the fork until its stop 16a bears against the element 18a.

The mounting of the tool holder in the slide 2 is initiated by the programmer and effected automatically with the aid of a screw 11a and of a captive nut 6a, as described in our aforementioned copending application. Even before the mounting operation is completed, the fork 26 is retracted along its return path in the opposite direction to that of the arrow F. The detent 37 is easily retracted because the tool holder 1 is locked.

Various modifications may be made to the illustrated embodiment. In particular, the magazine 9 may be of a different type, for example rectilinear and it may perform a reciprocating movement or, for example, move in a closed path comprising straight portions connected by semicircular portions, with a continuous movement. Similarly, the magazine driving, braking, and indexing device may also be of another type utilizing different means, as long as it enables any compartment of the magazine to be selected. The curved leaf spring 38 may be substituted for the straight adjustably mounted leaf spring 42, or vice versa.

What I claim is:

1. An automatic tool loader for a machine tool, comprising a magazine, a plurality of tool holders at respective locations therein, a handling device for removing a required tool holder from the magazine and for supplying the tool holder to a machine tool, means supporting the magazine and the handling device for relative movement to select the required tool holder, the magazine comprising for each tool holder a retaining device to engage and retain the tool holder in the magazine with a limited resiliently biassed retaining force which the handling device must overcome to supply the required tool holder to the machine tool, the handling device comprising a connecting device to connect the required tool holder to the handling device with a limited resiliently biassed connecting force, said force being sufficient to enable the handling device to supply the tool holder to the machine and to subsequently remove the tool holder from the machine tool when it is released thereby, said force being overcome by the handling device when the tool holder is retained by the machine tool for use or when the tool holder is returned to its location in the magazine, whereby the handling device is disconnected from the tool holder, and wherein said retaining device comprises a detent, the tool holder having means defining a recess therein which is engaged by the detent, a leaf spring supporting the detent from the magazine and resiliently biasing the detent into the recess.

2. An automatic tool loader as claimed in claim 1 in which the recess is a notch having a retaining face perpendicular to the relative motion between the tool holder and the magazine which occurs when the tool holder is supplied to the machine tool, the detent having a face which engages the retaining face when the detent is in the notch, and is inclined to the retaining face at an angle slightly greater than the angle of friction existing between the engaged faces.

3. An automatic tool loader as claimed in claim 1, wherein the connecting device comprises a detent, the tool holder having means defining a recess therein which is engaged by the detent, a leaf spring supporting the detent from the handling device and resiliently biassing the detent into the notch.

4. An automatic tool loader as claimed in claim 3 in which the recess is a notch having a retaining face perpendicular to the relative motion between the tool holder and the handling device during disconnection thereof, the detent having a face which engages the retaining face when the detent is in the notch, and is inclined to the retaining face at an angle slightly greater than the angle of friction existing between the engaged faces.

5. An automatic tool loader as claimed in claim 1 wherein the handling device comprises a forked member, each tool holder having shoulders which are engaged by the forked member to support the tool holder.

6. An automatic tool loader as claimed in claim 5 wherein each tool holder comprises respective inclined surfaces on the shoulders thereof, the fork member having corresponding inclined surfaces which engage the inclined surfaces on the said shoulders to lift the tool holder.

* * * * *

PO-1050
(5/69)

UNITED STATES PATENT OFFICE
CERTIFICATE OF CORRECTION

Patent No. 3,683,490  Dated August 15, 1972

Inventor(s) Martial Chabrier

It is certified that error appears in the above-identified patent and that said Letters Patent are hereby corrected as shown below:

Title page, fourth line (designation [73]), change C.H.M.P. to read C.N.M.P.

Signed and sealed this 8th day of May 1973.

(SEAL)
Attest:

EDWARD M.FLETCHER,JR.  ROBERT GOTTSCHALK
Attesting Officer  Commissioner of Patents